United States Patent
Chang et al.

(10) Patent No.: US 8,776,000 B2
(45) Date of Patent: Jul. 8, 2014

(54) METHOD OF IMPLEMENTING TIMING ENGINEERING CHANGE ORDER

(71) Applicants: Hua-Yu Chang, New Taipei (TW); Hui-Ru Jiang, Hsinchu (TW); Yao-Wen Chang, Taipei (TW)

(72) Inventors: Hua-Yu Chang, New Taipei (TW); Hui-Ru Jiang, Hsinchu (TW); Yao-Wen Chang, Taipei (TW)

(73) Assignee: National Chiao Tung University, Taipei (TW)

( * ) Notice: Subject to any disclaimer, the term of this patent is extended or adjusted under 35 U.S.C. 154(b) by 0 days.

(21) Appl. No.: 13/671,398

(22) Filed: Nov. 7, 2012

(65) Prior Publication Data

US 2013/0298097 A1    Nov. 7, 2013

(30) Foreign Application Priority Data

May 7, 2012 (TW) ............................. 101116185 A
Aug. 3, 2012 (TW) ............................. 101128031 A (51) Int. Cl.
  *G06F 17/50* (2006.01)
(52) U.S. Cl.
  USPC ........... 716/126; 716/100; 716/106; 716/108; 716/110; 716/111; 716/113; 716/129; 716/130; 716/132; 716/134; 716/139
(58) Field of Classification Search
  USPC ......... 716/100, 106, 108, 110, 111, 113, 132, 716/134, 139, 126, 129–130
  See application file for complete search history.

(56) References Cited

U.S. PATENT DOCUMENTS

| | | | |
|---|---|---|---|
| 7,072,815 B1 | 7/2006 | Chaudhary et al. | |
| 7,137,093 B2 | 11/2006 | Harn | |
| 7,707,530 B2 | 4/2010 | Alpert et al. | |
| 2003/0005398 A1 | 1/2003 | Cho et al. | |
| 2008/0052652 A1* | 2/2008 | Walian et al. | 716/6 |

OTHER PUBLICATIONS

Kuan-Hsien Ho, Jie-Hong R. Jiang, and Yao-Wen Chang, *TRECO: Dynamic Technology Remapping for Timing Engineering Change Orders*, Proceedings of the 2010 Asia and South Pacific Design Automation Conference (2010), pp. 331-336 (6 pgs.).

Yen-Pin Chen, Jia-Wei Fang, and Yao-Wen Chang, *ECO Timing Optimization Using Spare Cells*, IEEE/ACM International Conference on Computer-Aided Design, 2007, ICCAD 2007. (6 pgs.).

Hua-Yu Chang, Iris-Hui-Ru Jiang, and Yao-Wen Chang, *Timing ECO Optimization via Bézier Curve Smoothing and Fixability Identification*, Proceedings of the International Conference on Computer-Aided Design, 2011, pp. 742-746 (5 pgs.).

Shao-Yun Fang, Tzuo-Fan Chien and Yao-Wen Chang, *Redundant-Wires-Aware ECO Timing and Mask Cost Optimization*, Proceedings of the International Conference on Computer-Aided Design, 2010, pp. 381-336 (6 pgs.).

* cited by examiner

*Primary Examiner* — Stacy Whitmore
(74) *Attorney, Agent, or Firm* — DLA Piper LLP (US)

(57) ABSTRACT

A method of implementing timing ECO in a circuit includes the steps of performing a static timing analysis on the circuit so as to determine at least one timing violating path of the circuit, decomposing the timing violating path into at least one violating path segment, determining a smooth curve from each timing violating path and determining a plurality of reference points along the smooth curve, computing a fixability parameter of each gate on the violating path segment, extracting at least one gate according to the fixability parameters, and selecting one spare cell and disposing the selected spare cell on the violating path segment.

20 Claims, 11 Drawing Sheets

METHOD OF IMPLEMENTING TIMING ENGINEERING CHANGE ORDER

CROSS-REFERENCE TO RELATED APPLICATION

This application claims priorities of Taiwanese Patent Application No. 101116185, filed on May 7, 2012, and No. 101128031, filed on Aug. 3, 2012.

BACKGROUND OF THE INVENTION

1. Field of the Invention

The present invention relates to a method of implementing timing engineering change order (ECO), more particularly to a method of implementing timing ECO that takes into consideration smoothness of circuit paths.

2. Description of the Related Art

Since complexity in modern integrated circuit (IC) design has grown rapidly, some design failures that are hard to be detected may not be found until later stages of IC design, such as, after circuit layout, or even after chip fabrication. In order to correct the late-found design failures, it has become a trend for a current IC design house to not trace the failure back to early stages, and to adopt the metal-only engineering change order instead. The reason is that, in relevant researches, photomasks for a transistor layer is much more expensive than photomasks for a metal layer. Therefore, adopting metal-only ECO and maintaining the photomasks for the transistor layer unchanged is a cost saving way for failure correction.

To facilitate metal-only ECO, a placement tool is adopted to insert spare cells in a circuit. Once a design failure is detected, by selecting and rewiring appropriate spare cells, the design failure may be corrected. Typically, a circuit design is usually required to undergo many ECO runs. Therefore, how to save spare cells during the ECO runs is an important issue.

ECO may be classified into functional ECO and timing ECO. The functional ECO is used to correct functional errors and/or revise specification. The timing ECO is used to remedy signal imperfection and fix timing violations by gate sizing and/or buffer insertion.

In general, slack or delay of a gate is used to measure timing criticality of the gate. However, neither the slack nor the delay can reflect the timing criticality well, such that the timing violation may not be fixed effectively. For this reason, how to develop a method of implementing timing ECO, which is capable of determining timing criticality of gates precisely and fixing timing violation with less spare cells, is an object of the present invention.

SUMMARY OF THE INVENTION

Therefore, an objective of the present invention is to provide a method of implementing timing engineering change order (ECO) effectively.

Accordingly, the method of implementing timing ECO in a circuit that includes a plurality of gates and that is provided with a plurality of spare cells, according to the present invention, comprises the steps of:

(A) performing a static timing analysis on the circuit so as to determine at least one timing violating path of the circuit, each timing violating path including a sequence of the gates such that from each of its gates there is a wire connecting to the next gate in the sequence, and having negative edge slacks, which are slacks of edges that represent wires between the gates;

(B) decomposing each of the at least one timing violating path into at least one violating path segment having the same edge slack;

(C) determining a smooth curve from each of the at least one timing violating path, and determining a plurality of reference points that are evenly distributed along the smooth curve and that correspond respectively to the gates on the timing violating path;

(D) computing a fixability parameter of each of the gates on the violating path segment, wherein the fixability parameter is associated with a smoothness parameter of the respective gate, and the smoothness parameter is associated with a distance between the respective gate and the corresponding reference point;

(E) extracting at least one gate from the gates on the violating path segment, according to the fixability parameters of the gates on the violating path segment, to serve as at least one extracted gate;

(F) selecting one of the spare cells that is adapted for improving slack of a corresponding one of the at least one extracted gate as a selected spare cell, and disposing the selected spare cell on the violating path segment; and (G) rewiring the circuit so as to apply the selected spare cell.

An effect of the present invention resides in that, the fixability parameter of each of the gates is computed using the smooth curve so as to take into consideration the influence of geometrical smoothness of a path on timing criticality, such that the timing criticality of the gates may be determined precisely.

BRIEF DESCRIPTION OF THE DRAWINGS

Other features and advantages of the present invention will become apparent in the following detailed description of the four preferred embodiments with reference to the accompanying drawings, of which.

DETAILED DESCRIPTION OF THE PREFERRED EMBODIMENTS

Figure 1:
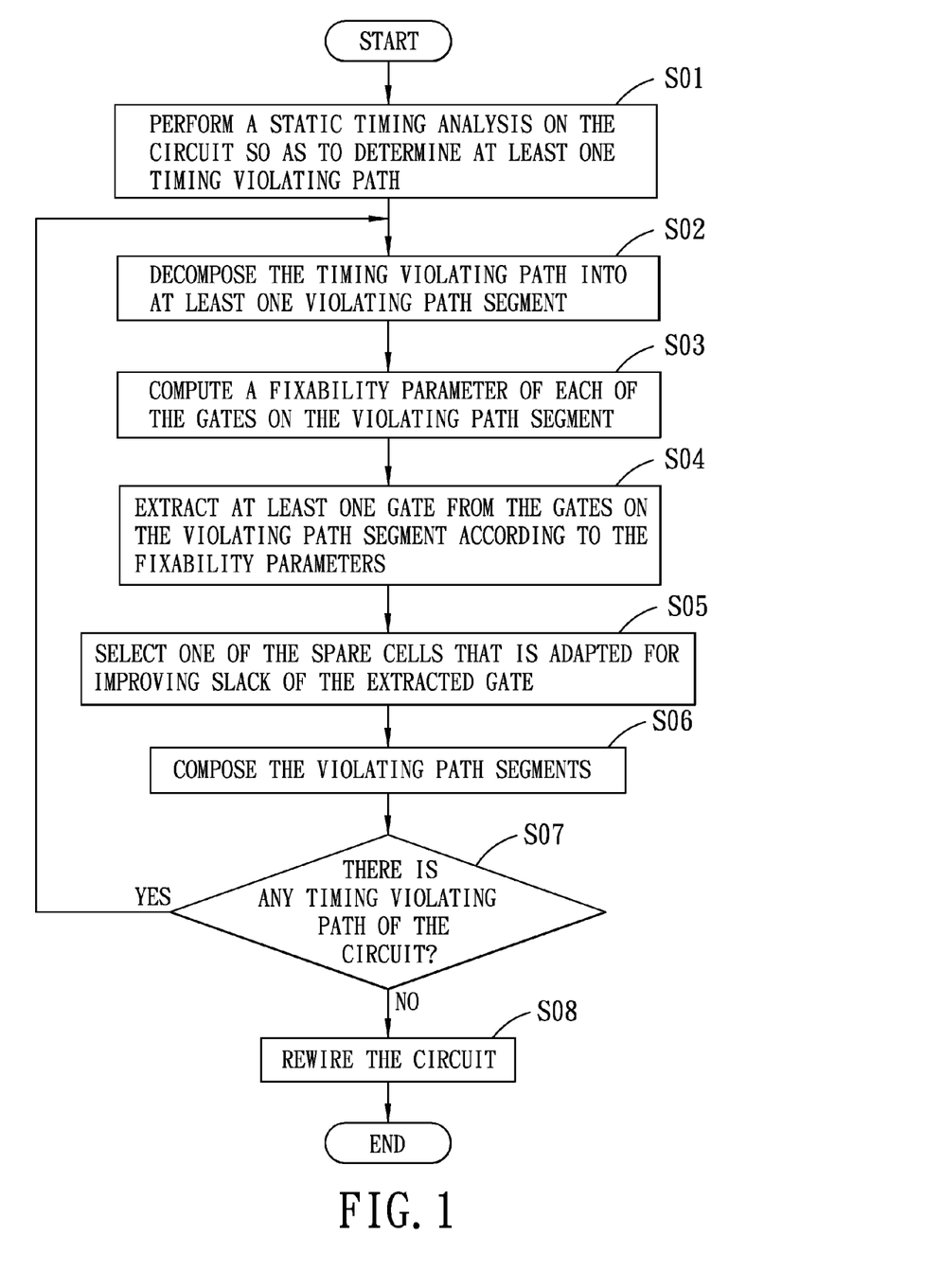
FIG. 1 is a flow chart illustrating a first preferred embodiment of a method of implementing timing engineering change order (ECO) according to the present invention.
Figure 16:
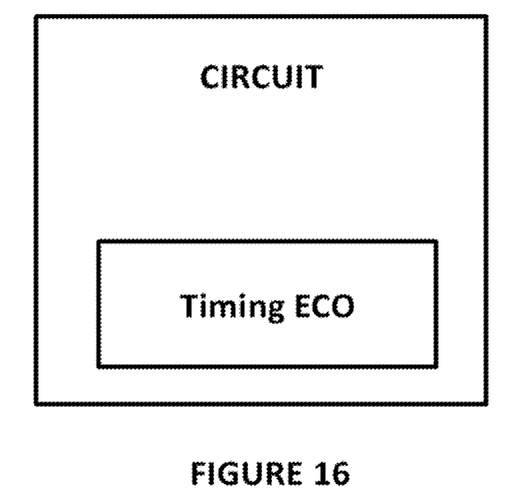
FIG. 16 is a diagram of an apparatus for implementing the method steps shown in FIG. 1.

Referring to FIG. 1, a first preferred embodiment of a method of implementing timing engineering change order (ECO) according to the present invention is illustrated. The timing ECO is to be implemented, as shown in FIG. 16, in a circuit that includes a plurality of gates and that is provided with a plurality of spare cells, so as to fix timing violations of the circuit. In the following description, H=(G, H) is used to represent the circuit, wherein each node $g_i \in G g_i \in G g_i \in G$ represents a gate on the circuit, D(i) represents rise or fall delay of the gate $g_i$, and each edge $e(i,j) \in E$ represents the wire between two gates $g_i, g_j \in G$. Procedures for the first preferred embodiment of the method of implementing the timing ECO are illustrated hereinafter.

First, step S01 is to perform a static timing analysis on the circuit so as to determine at least one timing violating path of the circuit. The timing violating path includes a sequence of the gates such that from each of its gates there is a wire connecting to the next gate in the sequence, and has negative edge slacks, which are slacks of edges that represent wires between the gates. Definitions associated with the timing violating path are explained hereinafter. In this embodiment, all of the timing violating paths of the circuit are determined in the static timing analysis, such that all timing violations in the circuit may be thus fixed.

An arrival time A(i) of an output signal of the gate $g_i \in G$ is computed as $$A(i) = \max_j \{A(j) \mid e(j, i) \in E\} + D(j).$$

A required time R(i) of the gate $g_i \in G$ is computed as $$R(i) = \min_k \left\{ \begin{array}{c} R(i, k) \mid R(i, k) = R(k) - D(k), \\ e(i, k) \in E \end{array} \right\},$$

wherein R(i,k) is an edge required time of the edge e(i,k).

Edge slack S(i,j) is slack of the edge e(i,j) that is contributed from the gate $g_j$ back to the gate $g_i$, and that is computed as $S(i,j) = R(i,j) - A(i).$ Gate slack S(i) is slack of the gate g(i), and is computed as $$S(i) = \min_j \{S(i, j) \mid e(i, j) \in E\}.$$

Alternatively, the gate slack S(i) can be computed as $S(i) = R(i) - A(i).$

Figure 2:
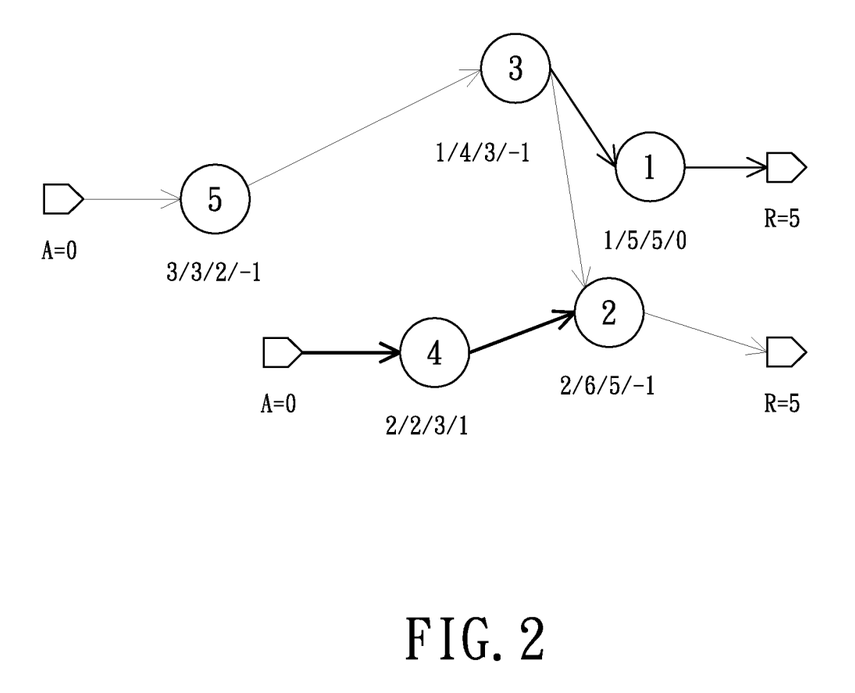
FIG. 2 is a schematic diagram illustrating a timing violating path of a circuit.

Based on the aforementioned definitions, a timing violating path P can be defined as a path with $S(i,j) < 0, \forall e(i,j) \in P.$ An example is given in FIG. 2 for explanation of the aforementioned definitions. In FIG. 2, circles represent the gates in the circuit, numbers in the circles represent assigned numbers to the respective gates, for example, the circle with a number of 5 stands for the gate $g_5$. Arrows represent interconnections between the gates. A series of numbers under each of the circles respectively represent delay/arrival time/required time/slack of a corresponding one of the gates. It is evident from FIG. 2 in combination with the aforementioned definitions that the edge slack S(3,1)=4−4=0, S(3,2)=3−4=−1, and the gate slack S(3)=−1. Moreover, since the edge slacks of the edges between interconnected ones of the gates $g_5$, $g_3$, and $g_2$ are all negative, a path through the gates $g_5$, $g_3$, and $g_2$ is a timing violating path.

Figure 3:
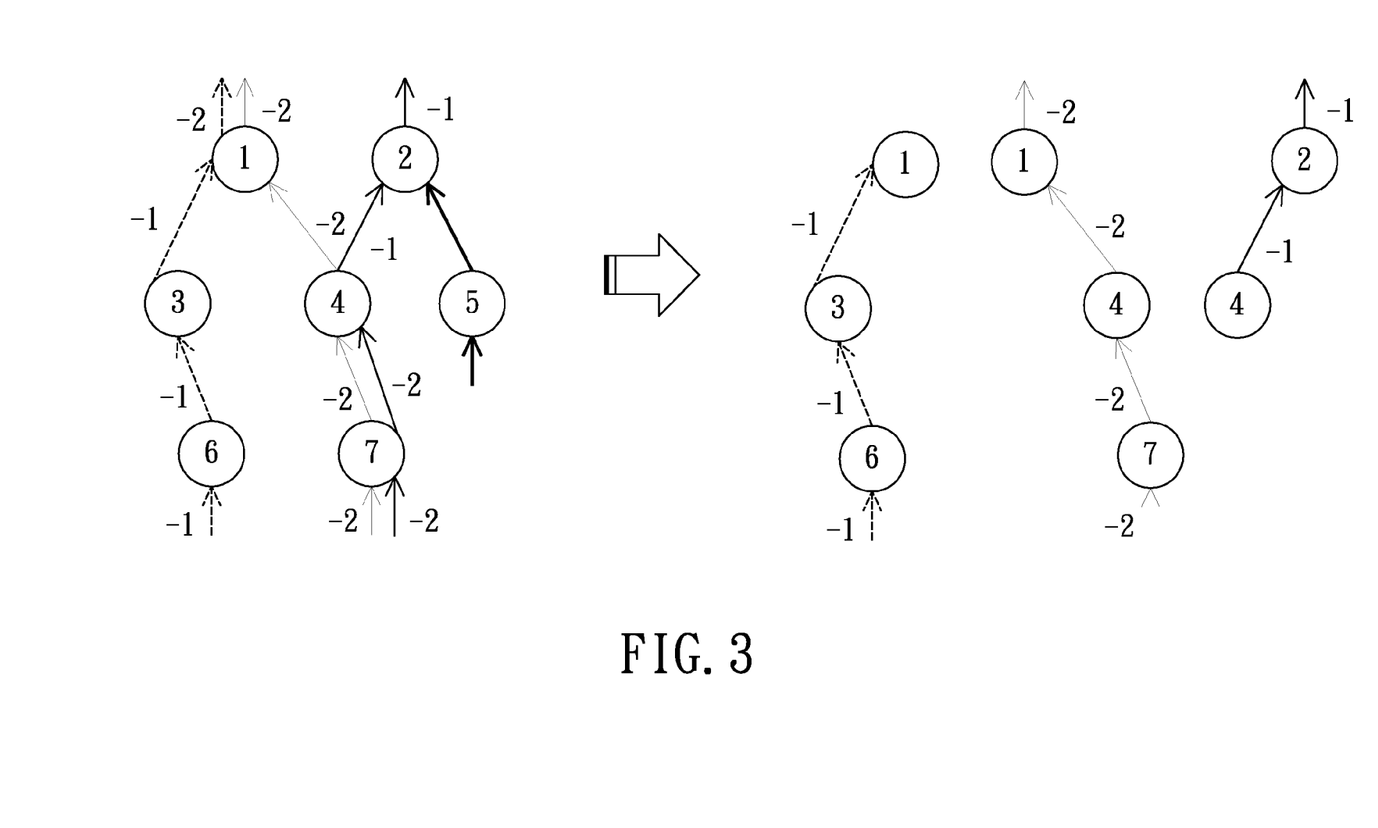
FIG. 3 is a schematic diagram illustrating decomposition of a plurality of timing violating paths into a plurality of violating path segments.

After all timing violating paths of the circuit are determined in step S01, step S02 is to decompose each timing violating path into at least one violating path segment having the same edge slack. The violating path segment is a segment of the timing violating path that includes the most consecutive edges having the same negative edge slack. A circuit on the left side of FIG. 3 is given as an example, and numbers proximate to arrows represent edge slacks. It is evident from FIG. 3 that the circuit includes a plurality of timing violating paths. After step S02, the timing violating paths are decomposed into three violating path segments shown on the right side of FIG. 3, which are respectively P(6,1), P(7,1), and P(4,2), and each of the violating path segments respectively has the same edge slacks of −1, −2, and −1. It is noted that, in this embodiment, when step S02 is performed, buffers and inverter pairs on the timing violating paths are released, and the released buffers and inverter pairs are regarded as available spare cells. In other words, the violating path segments do not include the buffers and inverter pairs on the original timing violating path from which the violating path segments are decomposed.

Subsequently, step S03 is to compute a fixability parameter $T_x(i)$ of each of the gates on the violating path segment. The fixability parameter $T_x(i)$ is associated with a smoothness parameter $T_s(i)$, a flexibility parameter $T_f(i)$, and a path sharing parameter $T_h(i)$ of the respective gate g(i). The fixability parameter $T_x(i)$ is expressed as $T_x(i) = (T_f(i) + T_s(i))T_h(i), \forall g_i \in G$ The fixability parameter $T_x(i)$ is used to indicate timing criticality of the respective gate g(i). In this embodiment, a higher value of the fixability parameter $T_x(i)$ represents higher timing criticality of the respective gate g(i). Computations related to the smoothness parameter $T_s(i)$, the flexibility parameter $T_f(i)$, and the path sharing parameter $T_h(i)$ are explained hereinafter.

The flexibility parameter $T_f(i)$ reflects the room for timing improvement, and is associated with a wire loading impact for the respective gate $T_l(i)$ and a slack difference of the respective gate $T_d(i)$. The wire loading impact $T_l(i)$ is associated with a difference between gate delays of the respective gate g(i) with and without wire loading (D(i) and $D_0(i)$), that is $T_l(i) = D(i) − D_0(i), \forall g_i \in G.$ The wire loading impact $T_l(i)$ corresponds to the maximum improvement that can be obtained by wire loading reduction. The slack difference $T_d(i)$ is associated with a difference between the worst one and the second worst one of the edge slacks of the respective gate g(i) to fanout gates of the respective gate g(i), that is $$T_d(i) = \min_k \left\{ \begin{array}{c} S(k,j) - S(i) \mid S(i) = S(i,j), \\ e(k,j) \in E \end{array} \right\}.$$

The slack difference $T_d(i)$ gives an upper bound of the impact on slack when the delay of the respective gate g(i) is improved. Preferably, the flexibility parameter $T_f(i)$ is associated with the smaller one of the wire loading impact $T_l(i)$ and the slack difference $T_d(i)$, i.e.

$T_f(i) = \min(T_l(i), T_d(i))$.

Figure 4:
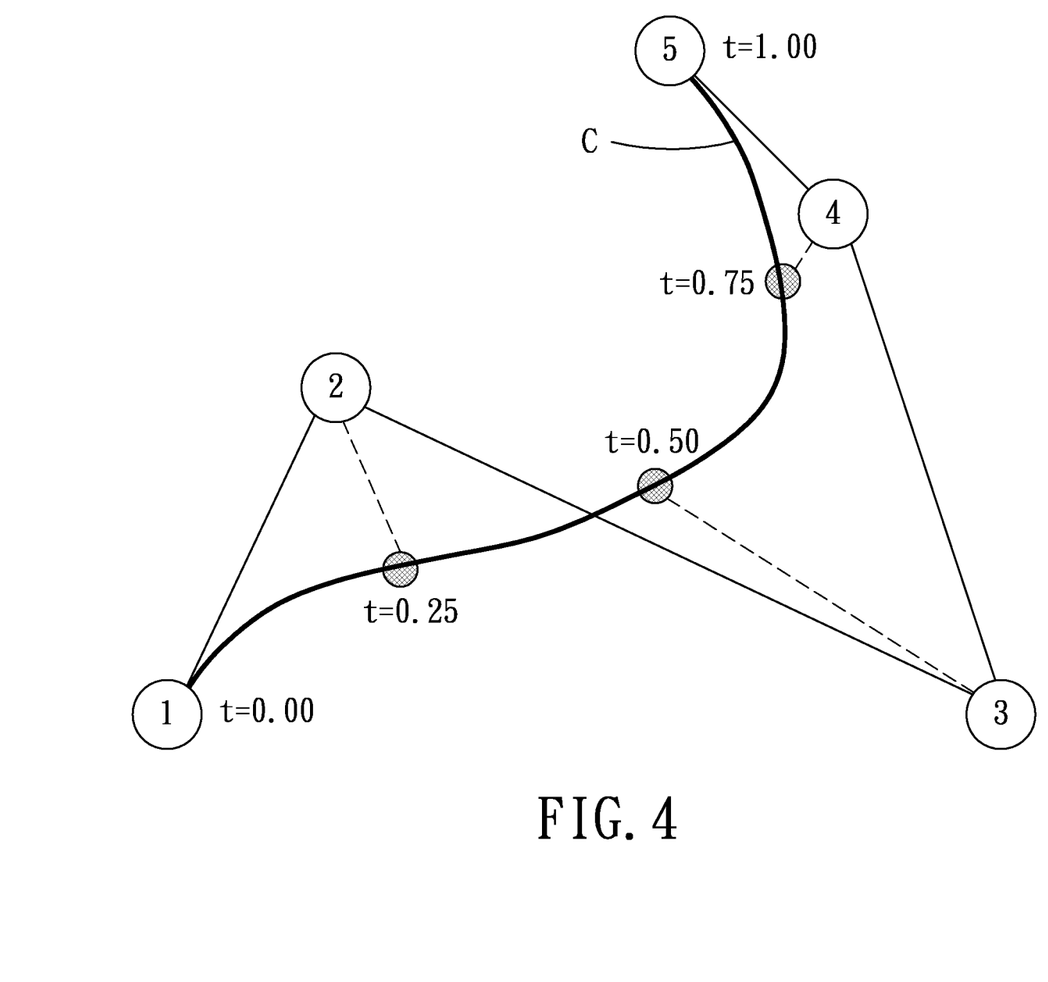
FIG. 4 is a schematic diagram illustrating a Bézier curve determined from a timing violating path and a plurality of reference points on the Bézier curve.

A path with good timing is desired to be geometrically smooth. The smoothness parameter $T_s(i)$ is related to geometrical smoothness of the violating path segment. To calculate the smoothness parameter $T_s(i)$, first of all, a smooth curve is determined from the timing violating path. The smooth curve is utilized as a baseline to measure the smoothness of the timing violating path. In this embodiment, the smooth curve is a Bézier curve, and the gates on the timing violating path are used as control points of the Bézier curve. Given as set of n+1 gates $g_0, g_1, \ldots, g_n$ on the timing violating path, the corresponding Bézier curve C(t) is given by a weighted sum of the control points $$C(t) = \sum_{i=0}^{n} g_i B_{i,n}(t),$$

wherein $B_{i,n}(t)$ is a Bernstein polynomial and $t \in [0,1]$. Referring to FIG. 4, a curve C is the corresponding Bézier curve of a timing violating path from gate $g_1$ to gate $g_5$, which has only one violating path segment.

A subsequent step for calculating the smoothness parameter $T_s(i)$ is to determine a plurality of reference points that are evenly distributed along the smooth curve and that correspond respectively to the gates on the timing violating path. The timing violating path and the curve C in FIG. 4 are given as an example. Since the Bézier curve C(t) has a curve interval of [0,1], and there are five gates on the timing violating path, the reference points corresponding to the gates $g_1, g_2, \ldots, g_5$ are C(t=0.00), C(t=0.25), C(t=0.50), C(t=0.75), and C(t=1.00), respectively.

A wirelength between each of the gates on the violating path and the corresponding reference point is considered as a wirelength penalty of the respective gate. Therefore, the smoothness parameter of the respective gate is defined as a difference between a gate delay related to the distance between the respective gate and the corresponding reference point $D_B(i)$ and a gate delay related to zero wire loading $D_0(i)$. The smoothness parameter $T_s(i)$ is represented as $T_s(i) = D_B(i) - D_0(i), \forall g_i \in G$.

Figure 5:
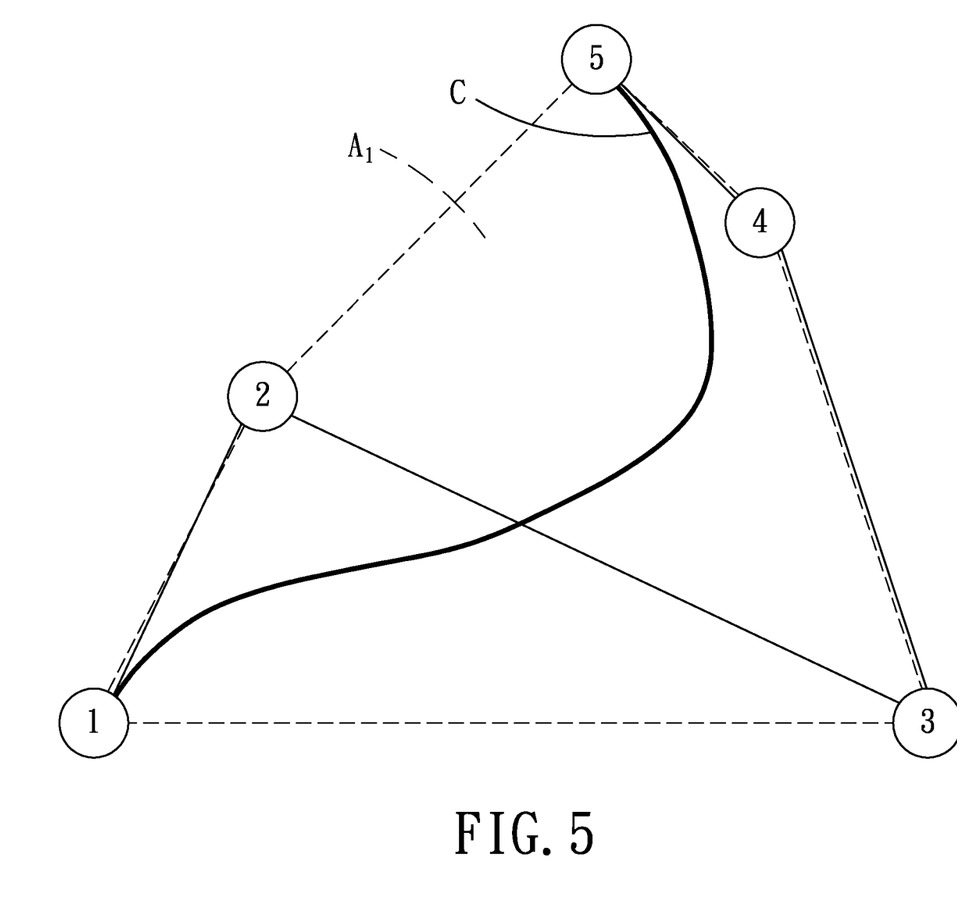
FIG. 5 is a schematic diagram similar to FIG. 4 that illustrates the Bézier curve being contained in a convex hull formed by control points of the Bézier curve.

It is noted that a Bézier curve has the following properties. First, a Bézier curve must be completely contained inside a convex hull of control points of the Bézier curve (i.e., the Bézier polygon). Referring to FIG. 5, the Bézier curve C is contained inside a convex hull $A_1$ of the gates $g_1, g_2, \ldots, g_5$.

Figure 6:
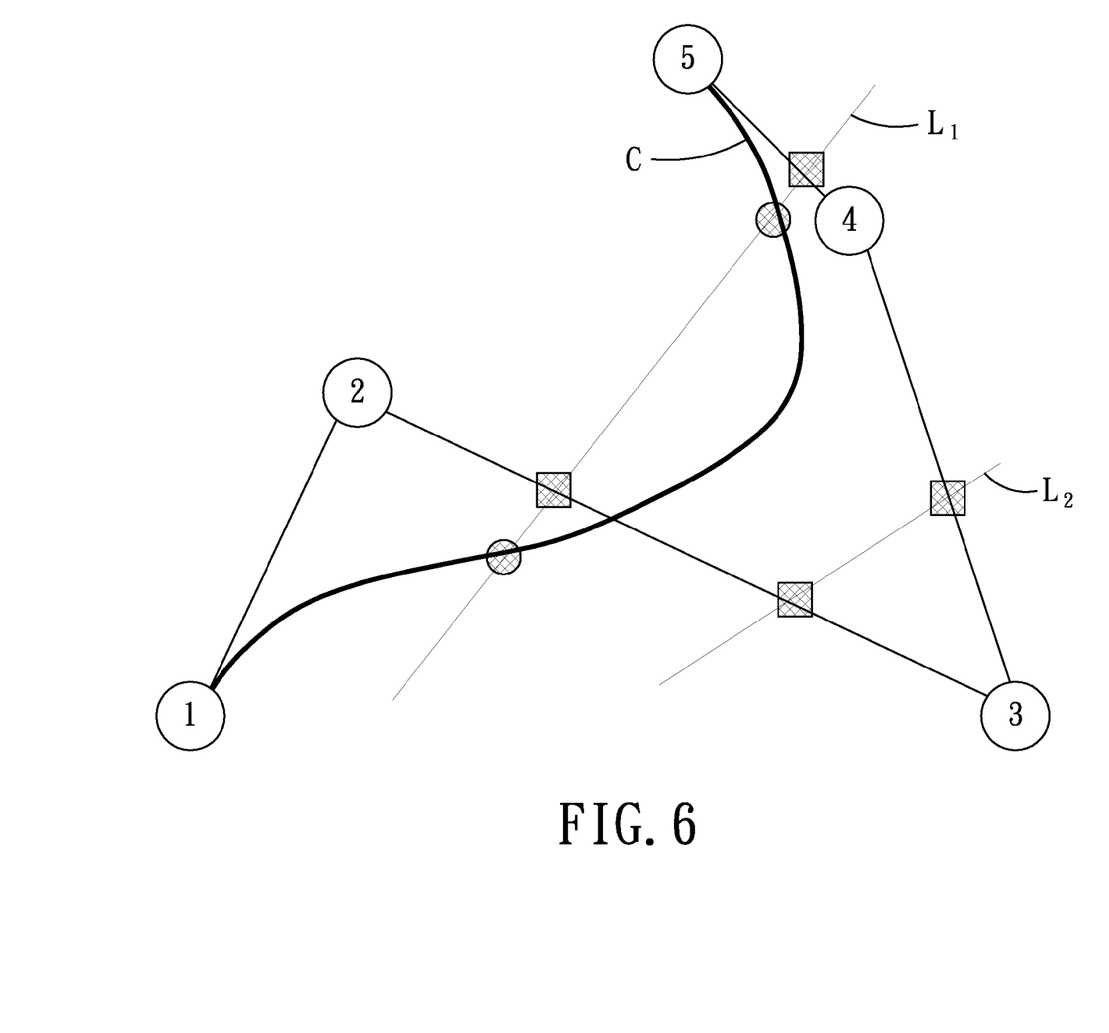
FIG. 6 is a schematic diagram similar to FIG. 4 that illustrates a variation diminishing property of a Bézier curve.

Moreover, referring to FIG. 6, a number of intersection points of any straight line (such as $L_1$ or $L_2$) with a Bézier curve is at most equal to a number of intersection points of the same straight line ($L_1$ or $L_2$) with polylines formed by the control points (i.e., the gates $g_1$~$g_5$). This property is called variation diminishing.

Figure 7:
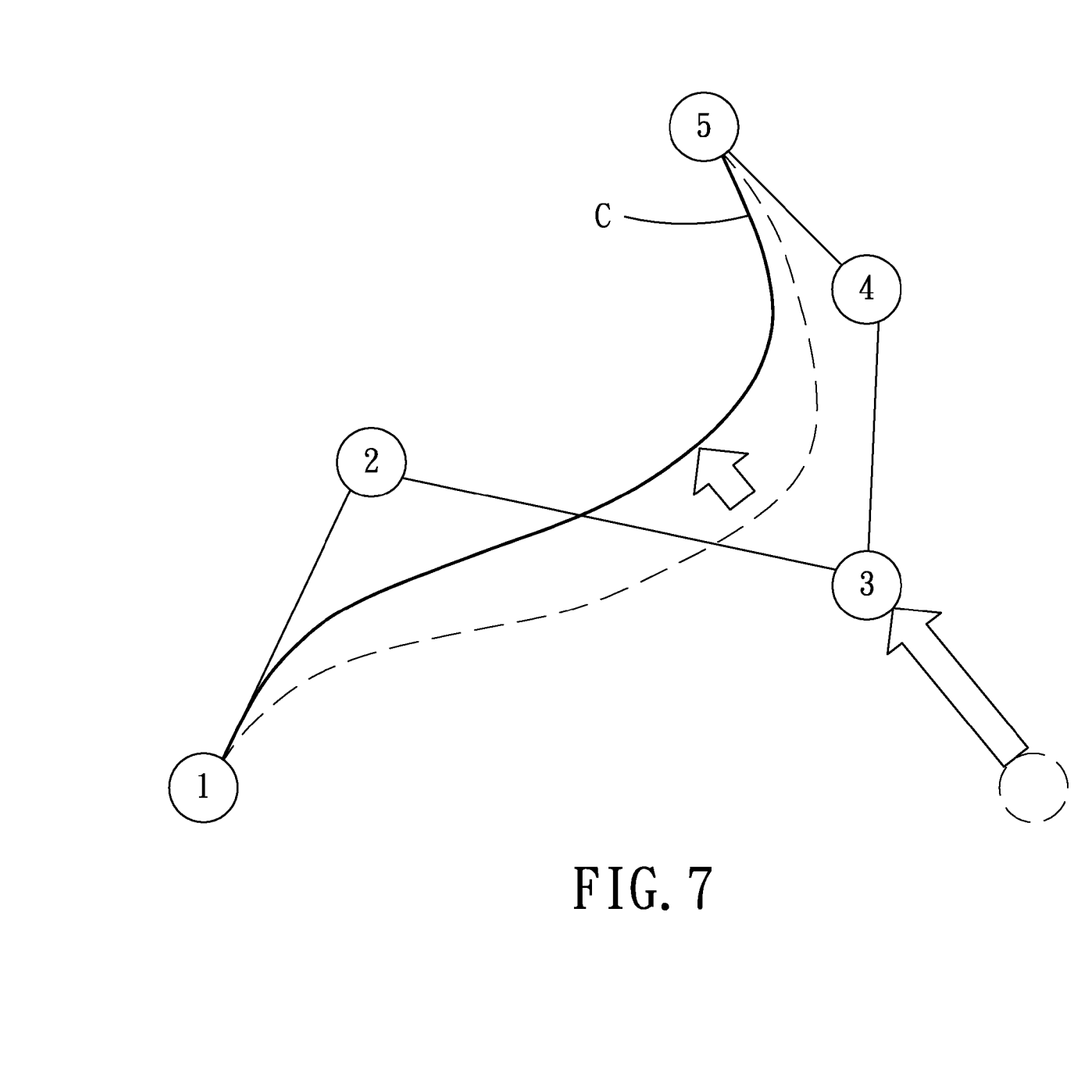
FIG. 7 is a schematic diagram similar to FIG. 4 that illustrates high predictability of a Bézier curve.

Further, a Bézier curve has a property of high predictability. If a position of a control point of the Bézier curve is adjusted, a shape of the Bézier curve changes accordingly in a predictable manner. Referring to FIG. 7, when the gate $g_3$ is moved toward the top left of FIG. 7, the shape of the Bézier curve changes accordingly. Based on the aforementioned three properties, Bézier curves are suitable to model geometrically smooth paths.

The path sharing parameter $T_h(i)$ is defined as a number of timing violating paths passing through the same respective gate. Since the more timing violating paths pass through a gate, the more timing of the timing violating paths may be improved at the same time when timing of the gate is improved, the path sharing parameter $T_h(i)$ may thus effectively measure timing criticality of a gate.

After computing the fixability parameter $T_x(i)$ of each of the gates on the violating path segment in step S03, step S04 is to extract one gate from the gates on the violating path segment, according to the fixability parameters of the gates on the violating path segment, to serve as an extracted gate. In this embodiment, the gate having the highest fixability is extracted to serve as the extracted gate.

Figure 8:
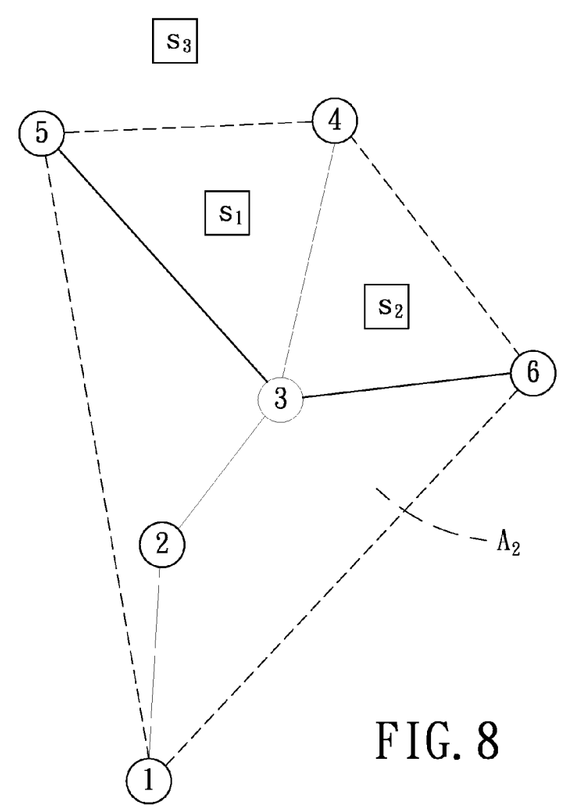
FIG. 8 is a schematic diagram illustrating that a spare cell candidate is a spare cell located within a convex hull of fanout gates of an extracted gate and the gates on the timing violating path.

Step S05 is to select one of the spare cells that is adapted for improving slack of the extracted gate as a selected spare cell. In this embodiment, the selected spare cell is to be selected from at least one spare cell candidate. The at least one spare cell candidate is determined from the spare cell that is adjacent to the extracted gate. Preferably, the at least one spare cell candidate is the spare cell located within a convex hull of fanout gates of the extracted gate and the gates on the timing violating path. For example, referring to FIG. 8, when a gate $g_3$ on a violating path segment P(1,4) is extracted, step S05 is to select one spare cell from a convex hull $A_2$ of the fanout gates of the extracted gate ($g_4$, $g_5$ and $g_6$) and the gates on the timing violating path ($g_1$~$g_4$). Since spare cells $s_1$ and $s_2$ are located within the convex hull $A_2$, the spare cells $s_1$ and $s_2$ are the spare cell candidates for the gate $g_3$. On the contrary, since spare cell $s_3$ is not located within the convex hull $A_2$, the spare cell $s_3$ is not a spare cell candidate for the gate $g_3$.

Figure 9:
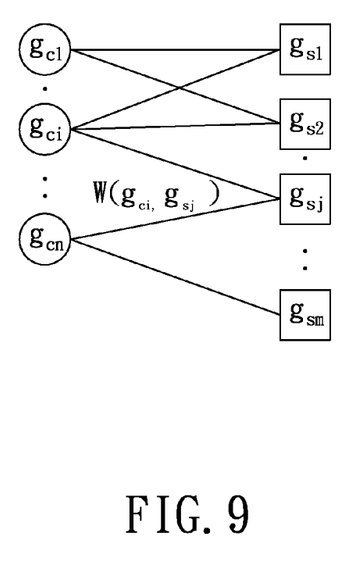
FIG. 9 is a bipartite graph illustrating that the spare cells are selected by minimum weight perfect matching.

In this embodiment, step S05 is regarded as a problem of minimum weight perfect matching. Referring to a bipartite graph $B = (G_C, G_S, E_B)$ illustrated in FIG. 9, a gate $g_{ci} \in G_C$ denotes the extracted gate on the i-th violating path segment (i.e., the gate having the highest fixability), and a spare cell $g_{sj} \in G_S$ denotes a spare cell candidate. Weight $w(g_{ci}, g_{sj})$ expresses the slack improvement if the gate $g_{ci}$ is matched to the spare cell $g_{sj}$. The slack if the gate $g_{ci}$ is matched to the spare cell $g_{sj}$ is represented as $S'(c_i | s_j) = R(g_{ci}) - A(g_{sj})$.

The aforementioned equation of slack may be estimated by means of the shielding effect and the loading dominance. A detailed description related to the shielding effect and the loading dominance is disclosed in "ECO timing optimization using spare cells and technology remapping" published in Proc. IEEE/ACM Int'l Conf. on Computer-Aided Design (ICCAD). The article is referred to as prior art DCP hereinafter.

In this embodiment, the weight $w(g_{ci}, g_{sj})$ is represented as $$w(g_{ci}, g_{sj}) = \begin{cases} 0, & S'(c_i | s_j) = 0; \\ \dfrac{S'(c_i | s_j)}{\max_k \{S'(c_i | s_k) \mid S'(c_i | s_k) > 0\}}, & S'(c_i | s_j) > 0; \\ 1 + \dfrac{S'(c_i | s_j)}{\min_k \{S'(c_i | s_k) \mid S'(c_i | s_k) < 0\}}, & S'(c_i | s_j) < 0. \end{cases}$$

$w(g_{ci}, g_{sj}) \in [0, 2]$.

When selecting an adequate spare cell, the spare cell that is able to make the edge slack of the violating path segment equal to zero has the highest priority for selection (i.e, $w(g_{ci}, g_{sj})=0$), the spare cell that is able to make the edge slack of the violating path segment equal to a positive value has the second highest priority for selection (i.e., $0<w(g_{ci},g_{sj})\leq 1$), and the spare cell that is able to make the edge slack of the violating path segment equal to a negative value has the least priority for selection (i.e., $1<w(g_{ci},g_{sj})\leq 2$). In this way, cost efficiency of the timing ECO may be promoted. It is noted that, in calculating the weight $w(g_{ci},g_{sj})$, the spare cell candidates that cause more timing violations after matching are ignored. In other words, only spare cell candidates that are able to improve slacks are considered when calculating the weight $w(g_{ci},g_{sj})$.

The selected spare cell is disposed on the violating path segment corresponding to the extracted gate. More specifically, the selected spare cell is used to replace the extracted gate (i.e., gate sizing). Alternatively, the selected spare cell is inserted in the violating path segment corresponding to the extracted gate (i.e., buffer insertion).

Figure 10:
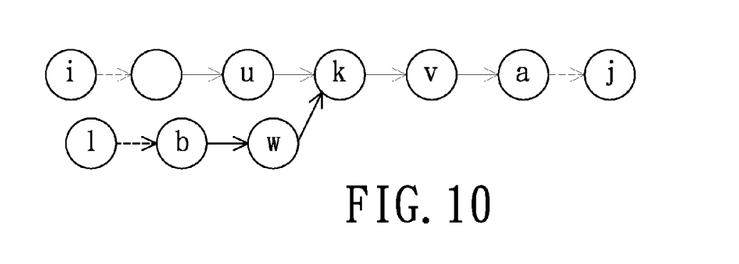
FIG. 10 to FIG. 13 are schematic diagrams illustrating four cases for composing two violating path segments.
Figure 11:
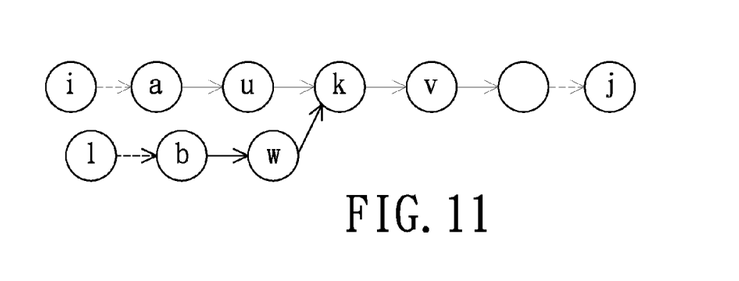
Figure 12:
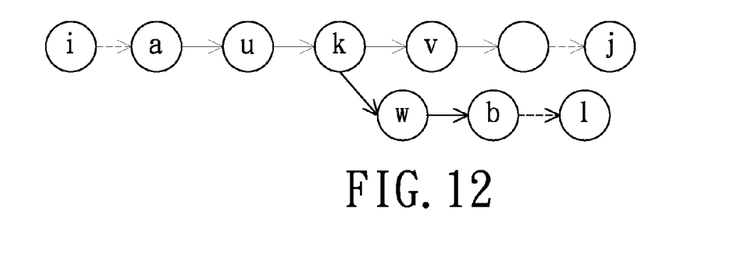
Figure 13:
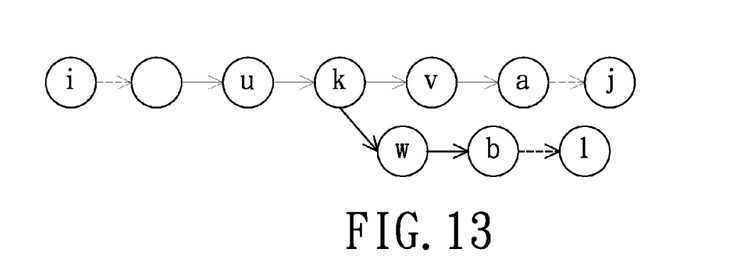

Subsequently, step S06 is to compose the violating path segments. When composing the violating path segments, a propagation property is utilized. The propagation property means that if a gate delay of a gate on a violating path segment $P(i,j)$ is improved (decreased) by t, $t \leq \min\{T_d(w)|g_w \in P(i,j)\}$, each edge slack of the violating path segment will also be improved (increased) by t. It is noted that if the gate is passed by multiple violating path segments, all the edge slacks of the violating path segments passing through the gate should be improved (increased) by t. Four cases for composing the violating path segments are illustrated in FIGS. 10 to 13. FIG. 10 and FIG. 11 illustrate the cases when two violating path segments $P(i,j)$ and $P(l,k)$ join at a gate $g_k$, and FIG. 12 and FIG. 13 illustrate the cases when two violating path segments $P(i,j)$ and $P(k,l)$ fork at a gate $g_k$. Assume that the edge slack of the violating path segment $P(i,j)$ is $S_1$, the extracted gate thereof is $g_a$, and the gate delay is improved by $t_1$ after disposition of a selected spare cell. Further assume that the edge slack of the violating path segment $P(l,k)$ is $S_2$, the extracted gate thereof is $g_b$, and the gate delay is improved by $t_2$ after disposition of a selected spare cell. Referring to FIG. 10, after composing the violating path segments $P(i,j)$ and $P(l,k)$, the edge slack of the violating path segment $P(i,j)$ is $S_1+t_1$, and the edge slack of the violating path segment $P(l,k)$ is $S_2+t_1+t_2$. Referring to FIG. 11, after composing the violating path segments $P(i,j)$ and $P(l,k)$, three violating path segment are generated as $P(i,k)$, $P(l,k)$ and $P(k,j)$, respectively. The edge slack of the violating path segment $P(i,k)$ is $S_1+t_1$, the edge slack of the violating path segment $P(l,k)$ is $S_2+t_2$, and the edge slack of the violating path segment $P(k,j)$ is $S_1+\max\{A(u)+D(k)-t_1, A(w)+D(k)-t_2\}$.

Referring to FIG. 12, after composing the violating path segments $P(i,j)$ and $P(k,l)$, the edge slack of the violating path segment $P(i,j)$ is $S_1+t_1$, and the edge slack of the violating path segment $P(k,l)$ is $S_2+t_1+t_2$. Referring to FIG. 13, after composing the violating path segments $P(i,j)$ and $P(k,l)$, three violating path segment are generated as $P(i,k)$, $P(k,l)$ and $P(k,j)$, respectively. The edge slack of the violating path segment $P(i,k)$ is $S_1+\min\{R(v)-D(v)+t_1, R(w)-D(w)+t_2\}$, the edge slack of the violating path segment $P(k,l)$ is $S_2+t_2$, and the edge slack of the violating path segment $P(k,j)$ is $S_1+t_1$.

After composition of the timing violating path segments, step S06 is further to determine whether each of the extracted gates of a respective one of the violating path segments is a redundant gate, and when it is determined that the extracted gate is the redundant gate, disposition of the selected spare cell, which corresponds to the redundant gate, on the violating path segment corresponding to the redundant gate is cancelled. The redundant gate is the extracted gate whose slack is fixed to be not smaller than zero when another one of the violating path segments is disposed with the corresponding selected spare cell. For example, referring to FIG. 10, if $S_2+t_1 \leq 0$, $g_b$ is a redundant gate.

Subsequently, step S07 is to perform the static timing analysis once again on the circuit, and determine whether there is any timing violating path of the circuit. The method proceeds to step S02 if it is determined in step S07 that there is the timing violating path, and proceeds to step S08 if otherwise.

Finally, S08 is to rewire the circuit so as to apply the selected spare cell (i.e., rewire design), and the procedures for the first preferred embodiment of the method end.

A second preferred embodiment of the method of implementing timing ECO according to the present invention is substantially similar to the first preferred embodiment, and differs in the configurations that, in step S03, the fixability parameter $T_x(i)$ is further associated with a spare-cell availability parameter $T_a(i)$ of the respective gate. In this embodiment, the fixability parameter $T_x(i)$ is expressed as $$Tx(i)=(T_f(i)+T_s(i))T_h(i)T_a(i), \forall g_i \in G$$

Figure 14:
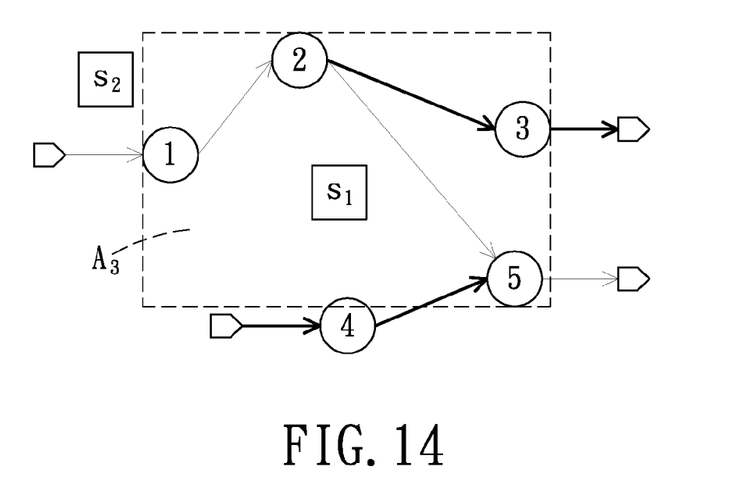
FIG. 14 is a schematic diagram illustrating that a spare-cell availability parameter of a gate is associated with a number of the spare cells in a bounding box formed by fanout and fanin gates of the respective gate.

The spare-cell availability parameter $T_a(i)$ is associated with a number of the spare cells in the vicinity of the respective gate. The timing ECO cannot be implemented when there is no spare cell adjacent to the extracted gate. Therefore, the spare-cell availability parameter $T_a(i)$ is a scale factor corresponding to an impact of available spare cells. In this embodiment, the spare-cell availability parameter $T_a(i)$ is defined as $$T_a(i) = \begin{cases} 1, n_s(i) > 0; \\ \alpha, n_s(i) = 0 \end{cases}$$

wherein $\alpha$ is a user-specified parameter $\in(0,1]$, and $n_s(i)$ is a number of the spare cells in a bounding box formed by fanout and fanin gates of the respective gate. When $n_s(i)=0$, $\alpha$ is used to reduce the spare-cell availability parameter $T_a(i)$ so as to reduce the fixability parameter $T_x(i)$ accordingly. A circuit in FIG. 14 is given as an example. When a gate $g_2$ on a violating path segment $P(1,5)$ is extracted to serve as availability parameter $T_a(2)$, a number of the spare cells in a bounding box $A_3$ formed by fanout and fanin gates $g_3$, $g_5$ and $g_1$ of the extracted gate $g_2$ is considered. Since a spare cell $s_1$ is inside of the bounding box $A_3$ and a spare cell $s_2$ is outside of the bounding box $A_3$, $n_s(2)=1$ and $T_a(2)=1$. By taking the spare-cell availability parameter $T_a(i)$ into consideration, the fixability parameter $T_x(i)$ may express timing criticality of the respective gate more precisely.

A third preferred embodiment of the method according to the present invention is similar to the second preferred embodiment, and differs in the configurations that, in step S04, a number of the gates to be extracted from the gates on the violating path segment is further considered. That is, the extraction process is extended from one gate per segment to multiple gates per segment.

Specifically, step S04 includes the following sub-steps.

A first sub-step is to sort the gates on the violating path segment in a decreasing order of the fixability parameters. The sorted gates are denoted as $c_1, c_2, \ldots$.

A second sub-step is to calculate a slack improvement bound parameter $T_m(j)$ of each of the gates on the violating path segment, wherein the slack improvement bound parameter $T_m(j)$ is a maximum improvement on slack available for the respective gate by disposing any one of the spare cell candidates $s_k$ on the violating path segment. Assuming that the edge slack of the violating path segment is $S_i$, the slack improvement bound parameter $T_m(j)$ is represented as $$T_m(j) = \max_k \{S'(c_j \mid s_k) - S_i\}.$$

A third sub-step is to calculate a number n of the gates on the violating path segment to be extracted for serving as the at least one extracted gate, wherein the number n thus calculated is a minimum required number of the slack improvement bound parameters $T_m(j)$, such that a sum of the slack improvement bound parameters $T_m(j)$ in the order the gates are sorted is not smaller than the edge slack $S_i$ of the violating path segment. The number n may be obtained by the following relationship:

$$S_i \geq -\sum_{j=1}^{n} T_m(j) = -\sum_{j=1}^{n} \max_k \{S'(c_j \mid s_k) - S_i\}.$$

Figure 15:
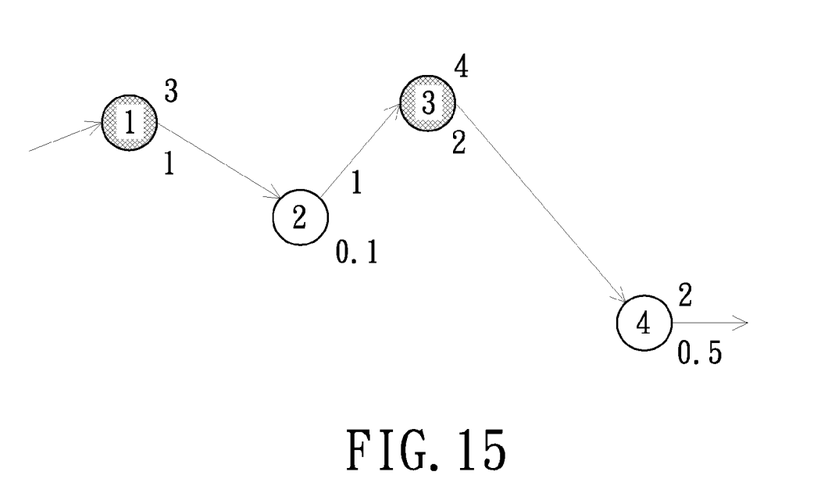
FIG. 15 is a schematic diagram illustrating that multiples of the gates are extracted in a third preferred embodiment of the method according to the present invention.

A fourth sub-step is to extract at least one gate from the gates on the violating path segment, according to the fixability parameter $T_x(i)$ and the number n calculated in the third sub-step, to serve as the at least one extracted gate. A violating path segment P(1,4) in FIG. 15 is given as an example for explanation. In FIG. 15, the fixability parameter of each of the gates is marked at a top right of a respective one of the gates, for example, the fixability parameter of the gate $g_1$ is 3. The slack improvement bound parameter of each of the gates is marked at a bottom right of a respective one of the gates, for example, the slack improvement bound parameter of the gate $g_1$ is 1. Assuming that the edge slack of the violating path segment P(1,4) is −3, the number n of the gates on the violating path segment P(1,4) to be extracted for serving as the at least one extracted gate is 2 (i.e., two gates are to be extracted), and the gates $g_3$ and $g_1$ are extracted (because −3≥(2+1). In this embodiment, by taking the number n of the gate to be extracted into consideration, the efficiency of the timing ECO may be further promoted.

A fourth preferred embodiment of the method according to the present invention is similar to the first preferred embodiment, and differs in the configurations that the fixability parameter $T_x(i)$ is only associated with the smoothness parameter $T_s(i)$, that is $$T_x(i) = T_s(i), \forall g_i \in G.$$

Relevant experimental data resulting from experiments using the first to fourth preferred embodiments of the method of implementing timing ECO are illustrated hereinafter, and are compared with two conventional techniques. One of the conventional techniques is the aforementioned prior art DCP, the other one is a technique disclosed in an article "Redundant-wires-aware ECO timing and mask-cost optimization" published in Proc. IEEE/ACM Int'l Conf. on Computer-Aided Design (ICCAD), and is referred to as prior art ILP hereinafter. The experiments were conducted with five industrial benchmark circuits which were also adopted in the prior arts DCP and ILP. The statistics of these circuits are summarized in Table I, and include the benchmark name (Circuit names), the number of gates in each design (Gate count), the number of available spare cells (#Spare cell), the clock period (Cycle), the number of timing violating paths (#Violating paths), the maximum number of gates on one timing violating path (#Max path), the total number of gates passed by the timing violating paths (#Gate passed), the worst negative slack (WNS), and the total negative slack (TNS).

TABLE I

| Circuit names | Gate count | #Spare cells | Cycle (ns) | #Violating paths | Max #gate | #Gate passed | WNS (ns) | TNS (ns) |
|---|---|---|---|---|---|---|---|---|
| 1 | 28,927 | 860 | 38 | 16 | 164 | 2,604 | 1.1 | 9.8 |
| 2 | 200,504 | 860 | 40 | 80 | 178 | 13,627 | 10.8 | 312.0 |
| 3 | 91,107 | 860 | 37 | 27 | 173 | 4,059 | 19.3 | 319.0 |
| 4 | 18,932 | 860 | 18 | 22 | 85 | 1,278 | 6.8 | 70.0 |
| 5 | 38,011 | 8,600 | 18 | 137 | 72 | 9,160 | 2.8 | 161.0 |

Table II provides the comparison among the prior arts DCP and ILP and the third preferred embodiment of the present invention on total negative slack (TNS) and run time. Table II also lists the number of resulting spare cells (#Resulting spares), the number of used buffers (#Used buf.), the number of released buffers/inverters (#Released buf/inv), the number of iterations (#Ite.), the maximum number of timing violating paths shared (Max #path shared), and the number of violating path segments (#Path segments). It is evident from Table II that the third preferred embodiment is capable of making the total negative slack of each of the five circuits equal to zero, and has efficiency 122.7 and 229.14 times higher than the prior arts DCP and ILP, respectively. It is noted that, compared to the number of gates passed by all timing violating paths (#Gate passed) in Table I, the number of violating path segments (#Path segments) in Table II is much smaller. Therefore, the third preferred embodiment of the present invention is capable of significantly reducing complexity in the timing ECO, so as to promote the efficiency for implementing the timing ECO. Moreover, the number of iterations (#Ite.) in Table II is small, implying that the present invention may fix timing violations of a circuit effectively.

Table III summarizes the comparison of run time, the number of resulting spare cells (#Resulting spares), the number of used buffers (#Used buf.), the number of released buffers/inverters (#Released buf/inv), and the number of iterations (#Ite.) among the first, second and third preferred embodiments. It is evident from Table III that the second preferred embodiment consumes fewer buffers than the first preferred embodiment, and the third preferred embodiment consumes even zero buffers, such that the third preferred embodiment has the best cost efficiency. Moreover, the number of iterations (#Ite.) of the third preferred embodiment is fewer than those of the first and second preferred embodiments, and run time of the third preferred embodiment is 3.32 and 4.09 times faster than those of the first and second preferred embodiments, implying that the third preferred embodiment has the best efficiency.

TABLE II

| | | DCP | | ILP | | The third preferred embodiment | | | | | | |
|---|---|---|---|---|---|---|---|---|---|---|---|---|
| Circuit name | Initial #Spare cells | TNS (ns) | Run Time (s) | TNS (ns) | Run time (s) | TNS (ns) | Run time (s) | #Resulting spares | #Used buf. | #Released buf/inv | #Ite. | Max #path shared | #Path segments |
| 1 | 860 | 0.0 | 6.12 | 0.0 | 42.42 | 0.0 | 0.28 | 880 | 0 | 8/12 | 1 | 16 | 19 |
| 2 | 860 | 0.0 | 25.71 | 0.0 | 109.48 | 0.0 | 3.90 | 893 | 0 | 7/26 | 2 | 30 | 138 |
| 3 | 860 | 14.93 | 12.33 | 0.0 | 26.29 | 0.0 | 0.99 | 949 | 0 | 19/70 | 2 | 27 | 73 |
| 4 | 860 | 6.27 | 24.31 | 0.0 | 55.41 | 0.0 | 0.05 | 898 | 0 | 32/6 | 1 | 9 | 22 |
| 5 | 8600 | 0.0 | 1761.16 | 0.0 | 3182.87 | 0.0 | 9.69 | 8,600 | 0 | 0/0 | 31 | 5 | 137 |
| Ratio | | 1.00 | 122.71 | | 229.14 | | 1.00 | 1.01 | | | | | |

TABLE III

| | The third preferred embodiment | | | | | The second preferred embodiment | | | | | The first preferred embodiment | | | | |
|---|---|---|---|---|---|---|---|---|---|---|---|---|---|---|---|
| Circuit name | Run time (s) | # Resulting Spares | # Used buf. | # Released buf/inv | #Ite. | Run time (s) | # Resulting Spares | # Used buf. | # Released buf/inv | #Ite. | Run time (s) | # Resulting Spares | # Used buf. | # Released buf/inv | #Ite. |
| 1 | 0.28 | 880 | 0 | 8/12 | 1 | 0.39 | 879 | 1 | 8/12 | 1 | 0.38 | 879 | 1 | 8/12 | 1 |
| 2 | 3.90 | 893 | 0 | 7/26 | 2 | 6.13 | 895 | 0 | 7/28 | 3 | 6.14 | 895 | 0 | 7/28 | 3 |
| 3 | 0.99 | 949 | 0 | 19/70 | 2 | 1.14 | 944 | 1 | 17/68 | 2 | 1.11 | 944 | 1 | 17/68 | 2 |
| 4 | 0.05 | 898 | 0 | 32/6 | 1 | 0.31 | 898 | 0 | 32/6 | 3 | 0.29 | 898 | 0 | 32/6 | 3 |
| 5 | 9.69 | 8,600 | 0 | 0/0 | 31 | 41.56 | 8,553 | 47 | 0/0 | 74 | 53.01 | 8,553 | 67 | 0/0 | 73 |
| Ratio | 1.00 | | 0.00 | 1.00 | 1.00 | 3.32 | | 0.71 | 1.00 | 2.24 | 4.09 | | 1.00 | 1.00 | 2.22 |

Table IV illustrates the experimental data associated with the fourth preferred embodiment. Compared with Table II, while the fourth preferred embodiment is also capable of making the total negative slack of each of the five circuits equal to zero, the number of iterations of the fourth preferred embodiment is slightly more than that of the third preferred embodiment.

TABLE IV

| | The fourth preferred embodiment | | | | |
|---|---|---|---|---|---|
| Circuit name | TNS (ns) | #Resulting spares | #Used buf. | #Released buf/inv | #Ite. |
| 1 | 0.0 | 880 | 0 | 8/12 | 1 |
| 2 | 0.0 | 893 | 0 | 7/26 | 2 |
| 3 | 0.0 | 936 | 1 | 15/62 | 2 |
| 4 | 0.0 | 898 | 0 | 32/6 | 1 |
| 5 | 0.0 | 8,588 | 12 | 0/0 | 52 |

To sum up, the method of implementing timing ECO according to the present invention, by virtue of the fixability parameter which is associated with the smoothness parameter, is capable of precisely determining timing criticality of a gate. Moreover, by virtue of the spare-cell availability parameter and the number of the gates on the violating path segment to be extracted for serving as the extracted gates, the present invention may implement the timing ECO with fewer spare cells. Last but not the least, by decomposing the timing violating path into at least one violating path segment, the present invention may promote efficiency for the timing ECO.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method of implementing timing engineering change order (ECO) in a circuit that includes a plurality of gates and that is provided with a plurality of spare cells, comprising the steps of:
   (A) performing a static timing analysis on the circuit so as to determine at least one timing violating path of the circuit, each timing violating path including a sequence of the gates such that from each of its gates there is a wire connecting to the next gate in the sequence, and having negative edge slacks, which are slacks of edges that represent wires between the gates;
   (B) decomposing each of the at least one timing violating path into at least one violating path segment having the same edge slack;
   (C) determining, for the circuit, a smooth curve from each of the at least one timing violating path, and determining a plurality of reference points that are evenly distributed along the smooth curve and that correspond respectively to the gates on the timing violating path;
   (D) computing, for the circuit, a fixability parameter of each of the gates on the violating path segment, wherein the fixability parameter is associated with a smoothness parameter of the respective gate, and the smoothness parameter is associated with a distance between the respective gate and the corresponding reference point;
   (E) extracting at least one gate from the gates on the violating path segment, according to the fixability parameters of the gates on the violating path segment, to serve as at least one extracted gate;
   (F) selecting one of the spare cells that is adapted for improving slack of a corresponding one of the at least one extracted gate as a selected spare cell, and disposing the selected spare cell on the violating path segment; and
   (G) rewiring the circuit so as to apply the selected spare cell.

2. The method as claimed in claim 1, wherein step (F) includes the sub-step of:

determining at least one spare cell candidate, from the spare cells, that is adjacent to the extracted gate, the selected spare cell to be selected from the at least one spare cell candidate.

3. The method as claimed in claim 1, further comprising, between step (F) and step (G):
(H) performing the static timing analysis once again on the circuit, and determining whether there is any timing violating path of the circuit,
wherein the method proceeds to step (B) if it is determined in step (H) that there is the timing violating path, and proceeds to step (G) if otherwise.

4. The method as claimed in claim 1, wherein, in step (D), the fixability parameter is further associated with a flexibility parameter of the respective gate, the flexibility parameter being associated with a wire loading impact for the respective gate, the wire loading impact being associated with a difference between gate delays of the respective gate with and without wire loading.

5. The method as claimed in claim 4, wherein, in step (D), the flexibility parameter is further associated with a slack difference of the respective gate, the slack difference being associated with a difference between the worst one and the second worst one of the edge slacks of the respective gate to fanout gates of the respective gate.

6. The method as claimed in claim 5, wherein the flexibility parameter is associated with the smaller one of the wire loading impact and the slack difference.

7. The method as claimed in claim 6, wherein the fixability parameter is associated with a sum of the smoothness parameter and the flexibility parameter.

8. The method as claimed in claim 1, wherein, in step (D), the fixability parameter is further associated with a path sharing parameter of the respective gate, the path sharing parameter being associated with a number of timing violating paths passing through the respective gate.

9. The method as claimed in claim 1, wherein, in step (C), the smooth curve is a Bezier curve.

10. The method as claimed in claim 9, wherein, in step (D), the smoothness parameter of the respective gate is further associated with a difference between a gate delay related to the distance between the respective gate and the corresponding reference point and a gate delay related to zero wire loading.

11. The method as claimed in claim 2, wherein, in step (F), the spare cell that is able to make the edge slack of the violating path segment equal to zero has the highest priority for selection, the spare cell that is able to make the edge slack of the violating path segment equal to a positive value has the second highest priority for selection, and the spare cell that is able to make the edge slack of the violating path segment equal to a negative value has the least priority for selection.

12. The method as claimed in claim 1,
wherein, in step (D), a higher value of the fixability parameter represents higher timing criticality of the respective gate; and
wherein, in step (E), the gate having the highest fixability is extracted to serve as the extracted gate.

13. The method as claimed in claim 3,
wherein, in step (B), the timing violating path is decomposed into a plurality of violating path segments; and wherein step (F) includes:
composing the violating path segments,
determining whether each of the extracted gates of a respective one of the violating path segments is a redundant gate, and
when it is determined that the extracted gate is the redundant gate, cancelling disposition of the selected spare cell, which corresponds to the redundant gate, on the violating path segment corresponding to the redundant gate, wherein the redundant gate is the extracted gate whose slack is fixed to be not smaller than zero when another one of the violating path segments is disposed with the corresponding selected spare cell.

14. The method as claimed in claim 1, wherein, in step (B), the violating path segment is a segment of the timing violating path that includes the most consecutive edges having the same negative edge slack.

15. The method as claimed in claim 2, wherein, in step (F), the spare cell candidate is the spare cell located within a convex hull of fanout gates of the at least one extracted gate and the gates on the timing violating path.

16. The method as claimed in claim 1, wherein, in step (F), the selected spare cell is used to replace the at least one extracted gate.

17. The method as claimed in claim 1, wherein, in step (F), the selected spare cell is inserted in the violating path segment corresponding to the extracted gate.

18. The method as claimed in claim 1, wherein, in step (D), the fixability parameter is further associated with a spare-cell availability parameter of the respective gate, the spare-cell availability parameter being associated with the number of the spare cells in vicinity of the respective gate.

19. The method as claimed in claim 18, wherein the spare-cell availability parameter of the respective gate is further associated with the number of the spare cells in a bounding box formed by fanout and fanin gates of the respective gate.

20. The method as claimed in claim 2,
wherein, in step (D), a higher value of the fixability parameter represents higher timing criticality of the respective gate;
wherein step (E) includes the sub-steps of:
(E1) sorting the gates on the violating path segment in a decreasing order of the fixability parameters,
(E2) calculating a slack improvement bound parameter of each of the gates on the violating path segment, wherein the slack improvement bound parameter is a maximum improvement on slack available for the respective gate by disposing any one of the spare cell candidates on the violating path segment,
(E3) calculating a number of the gates on the violating path segment to be extracted for serving as the at least one extracted gate, wherein the number thus calculated is a minimum required number of the slack improvement bound parameters, such that a sum of the slack improvement bound parameters in the order the gates are sorted is not smaller than the edge slack of the violating path segment, and
(E4) extracting at least one gate from the gates on the violating path segment, further according to the number calculated in step (E3), to serve as the at least one extracted gate.

* * * * *